United States Patent
Zhu et al.

(10) Patent No.: US 8,869,993 B2
(45) Date of Patent: Oct. 28, 2014

(54) FILTER USED FOR FILTERING MOLTEN METAL AND PREPARATION METHOD THEREOF

(75) Inventors: Jianxun Zhu, Zhangqiu Jinan (CN); Jinghao Liu, Zhangqiu Jinan (CN)

(73) Assignee: Jinan Shengquan Double Surplus Ceramic Filter Co., Ltd., Zhangqiu Jinan (CN)

( * ) Notice: Subject to any disclaimer, the term of this patent is extended or adjusted under 35 U.S.C. 154(b) by 0 days.

(21) Appl. No.: 13/576,603

(22) PCT Filed: Apr. 14, 2011

(86) PCT No.: PCT/CN2011/072770
§ 371 (c)(1),
(2), (4) Date: Aug. 1, 2012

(87) PCT Pub. No.: WO2011/127827
PCT Pub. Date: Oct. 20, 2011

(65) Prior Publication Data
US 2013/0020252 A1  Jan. 24, 2013

(30) Foreign Application Priority Data
Apr. 15, 2010 (CN) .......................... 2010 1 0151598

(51) Int. Cl.
| B01D 29/01 | (2006.01) |
| B01D 39/14 | (2006.01) |
| B01D 39/20 | (2006.01) |
| C04B 38/06 | (2006.01) |
| C22B 9/02 | (2006.01) |
| C04B 111/00 | (2006.01) |

(52) U.S. Cl.
CPC ........ B01D 39/2093 (2013.01); B01D 2239/08 (2013.01); B01D 2239/10 (2013.01); C04B 2111/0087 (2013.01); C04B 2111/00793 (2013.01); C04B 38/0615 (2013.01); C22B 9/023 (2013.01)
USPC ........... 210/510.1; 210/506; 210/496; 75/407

(58) Field of Classification Search
None
See application file for complete search history.

(56) References Cited

U.S. PATENT DOCUMENTS

| 3,090,094 | A | 5/1963 | Schwartzwalder et al. ..... 25/156 |
| 4,265,659 | A | 5/1981 | Blome ............... 75/93 |
| 5,104,540 | A | 4/1992 | Day et al. ................ 210/510.1 |
| 5,520,823 | A | 5/1996 | Jones et al. ................ 210/767 |
| 2004/0128857 | A1 | 7/2004 | Bell et al. ..................... 34/480 |
| 2009/0071293 | A1* | 3/2009 | Juma ............... 75/407 |

FOREIGN PATENT DOCUMENTS

| CN | 1449312 | 10/2003 |
| CN | 101224361 | 7/2008 |
| CN | 101257957 | 9/2008 |
| CN | 101810973 | 8/2010 |
| DE | 69202615 | 10/1995 |
| DE | 19828257 | 12/1999 |
| JP | 03-072909 | 3/1991 |
| JP | H07-507489 | 8/1995 |
| JP | 2007507667 A | 3/2007 |
| KR | 20060126432 A | 12/2006 |
| RU | 2315650 C2 | 1/2008 |
| WO | WO 02/18075 | 3/2002 |

OTHER PUBLICATIONS

Office Action issued in Chinese application No. 201010151598.6, dated Apr. 7, 2011 (English translation).
Notification on Grant of Patent Right for Invention issued in Chinese application No. 201010151598.6, dated Feb. 24, 2012 (English translation).
Examination Report issued in German Application No. 11 2011 101 296.9, dated Mar. 5, 2013.
Office Action issued in Japanese Patent Application No. 2013-504108, dated Mar. 14, 2013.
Notice of Allowance in Korean Patent Application No. 10-2012-7020401, issued Jul. 12, 2013.
Decision on Grant of Patent in Russian Patent Application No. 2012132954/05(052260), issued Jun. 3, 2013.

* cited by examiner

Primary Examiner — Benjamin Kurtz
(74) Attorney, Agent, or Firm — Fulbright & Jaworski LLP

(57) ABSTRACT

A filter used for filtering molten metal and a preparation method thereof are disclosed. The filter comprises open-pored porous material, binder and refractory material. The refractory material is bonded on the open-pored porous material by the binder, wherein the weight proportion of the binder is at least 50% and the weight proportion of the refractory material is not more than 50%. The filter has enhanced mechanical property and high temperature resisting property, while its preparation method is more cost-efficient than usual ones.

6 Claims, No Drawings

FILTER USED FOR FILTERING MOLTEN METAL AND PREPARATION METHOD THEREOF

This application is a national phase application under 35 U.S.C. §371 of International Patent Application No. PCT/CN2011/072770 filed Apr. 14, 2011, which claims priority to Chinese Patent Application No. 201010151598.6, filed with the State Intellectual Property Office of China on Apr. 15, 2010, entitled "FILTER USED FOR FILTERING MOLTEN METAL AND PREPARATION METHOD THEREOF", the entire contents of each of which are incorporated herein by reference in their entirety without disclaimer.

FIELD OF THE INVENTION

The present invention relates to a field of filter preparation, in particular relates to a filter used for filtering molten metal and a preparation method thereof.

BACKGROUND ART

At present, a lot of literatures regarding filters used for filtering molten metal are available.

U.S. Pat. No. 5,104,540 (Corning Inc.) discloses a carbon-coated porous sintered ceramic filter for filtering molten metal, comprising a single unit filter substrate material formed from refractory material such as alumina, mullite, zircon powder, zirconia, spinel, cordierite, lithium, alumino-silicate, titanate, feldspar, quartz, fumed silica, silicon carbide, kaolin, aluminum titanate, silicate, aluminate and mixtures thereof. A carbon-based coating is applied to the surface of the filter screen or used as a thermite.

U.S. Pat. No. 5,520,823 discloses a filter only for filtering molten aluminum, wherein borosilicate glass is employed as the binder. Although the filter contains graphite, considerable amount of graphite is lost due to sintering in the air. The loss of carbon limits this filter to be used in filtering aluminum metal only while is not suitable for filtration of molten iron or steel.

WO 0218075 discloses a filter for filtering molten metal, wherein the filter comprises open cell porous material containing refractory particles bonded together by a binder containing carbon structure. That is to say, in this filter, no other bonding mechanism except for carbon binder exists.

In the present filters, the high temperature resistance of the filter is enhanced by the employment of carbon binder, while the content thereof needs to be controlled within a narrow range, which is not favourable for controlling the contents of the binder during the processing. Furthermore, although carbon containing refractory materials can withstand temperature higher than that of the molten metal, prevent metal penetration, exhibit very high strength at high temperature and show better thermal shock resistance; unfortunately, the filter bonded by carbon binder has very low strength at room temperature, at the same time, it tends to absorb moisture, thus influencing the use of this product under high temperature.

SUMMARY OF THE INVENTION

In view of the above, the present invention provides a filter for filtering molten metal and a manufacturing method thereof, to improve the mechanical property at ambient temperature and the high temperature resistance of the filter.

To achieve the above object, the present invention provides the following technical solutions:

A filter for filtering molten metal, comprising an open cell porous material, a refractory material and a binder, wherein the refractory material is bonded to the open cell porous material by the binder, and the weight ratio of the binder to the refractory material is at least 50 wt % of the binder to no more than 50 wt % of the refractory material.

Preferably, in the above mentioned filter, the refractory material includes one or more selected from the group consisting of zirconium mullite, mullite, corundum, clay, pyrophyllite, wollastonite, cyanite, sillimanite, spinel or olivine.

Preferably, in the above mentioned filter, the binder includes one or more selected from the group consisting of carbon black, graphite, carbon, asphalt, tar, synthetic asphalt, synthetic resin, natural resin, anthracite coal, aluminum dihydrogen phosphate, alumina sol, alumino silica gel, silica sol, PVA, white latex, dextrin, starch, CMC or MC.

Preferably, in the above mentioned filter, the weight ratio of the binder to the refractory material is 50~70 wt % of the binder to 30~50 wt % of the refractory material.

The present invention also discloses a method for manufacturing a filter for filtering molten metal, comprising:

formulating a refractory material, a binder, an additive and a liquid carrier into slurry;

coating the slurry thus formulated onto an open cell porous material to form at least one refractory coating;

sintering the open cell porous material formed with the refractory coating under a sintering temperature;

wherein the weight ratio of the binder to the refractory material is at least 50 wt % of the binder to no more than 50 wt % of the refractory material.

Preferably, in the above mentioned method, the weight ratio of the total weight of the refractory material, the binder and a dispersant to the weight of the liquid carrier is at least 70%:30%.

Preferably, in the above mentioned method, the content of the refractory material, the binder and a dispersant is as follows, respectively:

20~45 wt % of the refractory material;
52~78 wt % of the binder;
1~9 wt % of the additive.

Preferably, in the above mentioned method, the liquid carrier is water.

Preferably, in the above mentioned method, the open cell porous material is reticulated open cell polyurethane foam.

Preferably, in the above mentioned method, the sintering temperature is no more than 1150° C.

Preferably, in the above mentioned method, the method further comprises: before the step of "sintering the open cell porous material formed with refractory coating under sintering temperature", drying the open cell porous material coated with the refractory coating under a temperature between 100 and 200° C.

Preferably, in the above mentioned method, the refractory material includes one or more selected from the group consisting of zirconium mullite, mullite, corundum, clay, pyrophyllite, wollastonite, cyanite, sillimanite, spinel or olivine.

Preferably, in the above mentioned method, the binder includes one or more selected from the group consisting of carbon black, graphite, carbon, asphalt, tar, synthetic asphalt, synthetic resin, natural resin, anthracite coal, aluminum dihydrogen phosphate, alumina sol, alumino silica gel, silica sol, PVA, white latex, dextrin, starch, CMC or MC.

Preferably, in the above mentioned method, the weight ratio of the binder to the refractory material is 50~70 wt % of the binder to 30~50 wt % of the refractory material.

By increasing the component and content of the binder in the filter and combining the use of the refractory material, the mechanical property of the filter is greatly enhanced and the high temperature resistance of the filter is increased, so that the filter can filter molten metal at harsh temperature, and the mechanical properties, such as tensile strength, elongation rate and the like, of the casts after filtration by the filter are significantly improved. In addition, the components selected and used in the production of the filter are economic, and the filter is easy to be produced in the production process, such that the manufacture of the filter is more economic.

DETAILED DESCRIPTION

The terms used herein are illustrated as follows:
PVA is the abbreviation for polyvinyl alcohol.
CMC is the abbreviation for carboxyl methyl cellulose.
MC refers to methyl cellulose.

The open cell porous material means a solid material comprising cells having regular, partly regular, irregular or random distribution, these cells being the passage for the molten metal. Such cells may communicate with each other totally or partly, or have several passages for passing through the molten metal. The size and shape of the cells themselves can be regular or irregular. For example, such cells can comprise a series of parallel passages linearly passing through the solid material, and the passages may have any desired cross section, such as communicated passage of circle, ellipse or triangle, similarly to the porous distribution of natural foam. The preferred open cell porous material is reticulated open cell polyurethane foam which is commercially available and has relatively regular distribution. It is well known that such material can be used in the manufacture of the refractory material filter for filtering molten metal.

Hereinafter, a clear and complete disclosure of embodiments of the present invention will be presented for purposes of illustration and description. It should be clear that, the embodiments to be described are merely a part rather than all of the embodiments of the present invention. All other embodiments obtained by persons skilled in the art based on the embodiments of the present invention without creative efforts falls within the protection scope of the present invention.

The embodiments of the invention disclose a filter for filtering molten metal and a manufacturing method thereof, to improve the high temperature resistance and mechanical property of the filter.

To achieve the above object, the embodiments of the invention employ the following technical solutions. In the present invention, the refractory ingredients are modified compared with those in the prior art and the corresponding filter manufacturing method is modified accordingly.

A filter for filtering molten metal, comprising an open cell porous material, a binder and a refractory material, wherein the refractory material is bonded to the open cell porous material through the binder, and the weight ratio of the binder to the refractory material is at least 50 wt % of binder to no more than 50 wt % of the refractory material.

The refractory material is mainly selected from one or more of zirconium mullite, mullite, corundum, clay, pyrophyllite, wollastonite, cyanite, sillimanite, spinel or olivine.

Wherein the binder includes carbon-based material and binding material, the main function of the both being to bind the refractory material onto the open cell porous material. The carbon-based material is mainly selected from carbon black, graphite, carbon, asphalt, tar, synthetic asphalt, synthetic resin, natural resin or anthracite coal, while the binding material is mainly selected from one or more of aluminum dihydrogen phosphate, alumina sol, alumino silica gel, silica sol, PVA, white latex, dextrin, starch, CMC or MC.

The weight ratio of the binder to the refractory material is preferably 50~70 wt % of binder to 30~50 wt % of refractory material.

The invention also discloses a method for manufacturing a filter for filtering molten metal, comprising:
formulating a refractory material, a binder, an additive and a liquid carrier into a slurry;
coating the slurry thus formulated onto an open cell porous material to form at least one refractory coating;
sintering the open cell porous material formed with the refractory coating under a sintering temperature;
wherein the weight ratio of the binder to the refractory material is at least 50 wt % of the binder to no more than 50 wt % of the refractory material.

The weight ratio of the total weight of the refractory material, the binder and the dispersant to the weight of the liquid carrier is at least 70%:30%, preferably 75%:25%, more preferably 80%:20%.

The content of the refractory material, the binder and the dispersant is as follows, respectively:
20~45 wt % of the refractory material;
52~78 wt % of the binder;
1~9 wt % of the additive.

The additive includes mainly a dispersant and an active agent; the liquid carrier is water, and can also be methanol or ethanol.

The method further comprises: before the step of sintering, drying the open cell porous material coated with the refractory coating under a temperature between 100 and 200° C.

During the sintering, the sintering temperature shall be no more than 1150° C., preferably no more than 1100° C. The sintering shall be conducted in oxygen-deficient atmosphere, such as in nitrogen, argon or vacuum, or in reducing atmosphere, such as in hydrogen and/or carbon monoxide, or coal gas. The sintering is generally conducted in a dry oven or in a kiln; however, other forms of heat source, such as microwave that carries out radio frequency heating, can also be used.

The refractory material includes one or more selected from the group consisting of zirconium mullite, mullite, corundum, clay, pyrophyllite, wollastonite, cyanite, sillimanite, spinel or olivine.

The binder includes one or more selected from the group consisting of carbon black, graphite, carbon, asphalt, tar, synthetic asphalt, synthetic resin, natural resin, anthracite coal, aluminum dihydrogen phosphate, alumina sol, alumino silica gel, silica sol, PVA, white latex, dextrin, starch, CMC or MC.

The weight ratio of the binder to the refractory material is preferably 50~70 wt % of the binder to 30~50 wt % of the refractory material.

The particle size of the refractory material and the carbon material can be smaller than 50 μm, preferably smaller than 30 μm, more preferably smaller than 20 μm.

EXAMPLE 1

A slurry was prepared by adding water to 45 wt % of corundum, 50 wt % of carbon, 2 wt % of alumino silica gel, 1.5 wt % of dispersant and 1.5 wt % of active agent, wherein the weight ratio of the total weight of corundum, carbon, alumino silica gel, dispersant and active agent to the weight of water is 100%:12%.

The obtained slurry was used for coating polyurethane foam which has been properly cut. The coated foam was dried and then sprayed with the diluted slurry again, followed by singering at 950° C. after being dried again.

EXAMPLE 2

A slurry was prepared by adding water to 29 wt % of spinel powder, 56 wt % of carbon, 12 wt % of silica sol, 2.5 wt % of dispersant and 0.5 wt % of active agent, wherein the weight ratio of the total weight of spinel powder, carbon, silica sol, dispersant and active agent to the weight of water is 100%: 18%.

The slurry was prepared by mixing the powdery materials and the water in a high performance mixer. The obtained slurry was used for coating polyurethane foam. The coated foam was dried, and then coated with the diluted slurry once more and dried again; finally, the foam was sintered at 1100° C.

EXAMPLE 3

Water is added to 30 wt % of mullite powder, 47 wt % of carbon, 20 wt % of high softening point asphalt, 2 wt % of PVA, 2 wt % of dispersant and 1.0 wt % of active agent, wherein the weight ratio of the total weight of mullite powder, carbon, high softening point asphalt, polyvinyl alcohol, dispersant and active agent to the weight of water is 100%:20%.

The slurry was prepared by mixing the mullite powder, carbon, high softening point asphalt, PVA and the water in a high performance mixer. The obtained slurry was used for coating polyurethane foam and the coated foam was dried. The foam was sprayed with the diluted slurry once more and dried again; finally, the foam was sintered at 1150° C. in oxygen-free atmosphere.

EXAMPLE 4

A slurry was prepared by adding water to a powdery mixture of 40 wt % of electromelt mullite powder, 20 wt % of corundum, 20 wt % of flake graphite powder, 10 wt % of amorphous graphite, 4 wt % of CMC, 0.5 wt % of dispersant and 0.5 wt % of active agent, wherein the weight ratio of refractory material to the water is 100%:22%. The slurry was prepared by mixing the powdery materials and the water in a high performance mixer. The mixed slurry was used for shaping polyurethane foam and the shaped foam was dried. The foam was sprayed with the diluted slurry once more and dried at about 120° C. again; finally, the foam was sintered at 1120° C. in oxygen-free atmosphere.

The size of the filter prepared according to the above four formulations was 50*50*15 mm. The obtained filter was used to filter 50 kg of molten steel ZG45 at 1650° C. The result shows that the filter withstood the testing condition and performed as required in filtering the molten steel. According to the tests carried out on the casts after filtration, the tensile strength, the elongation rate and the structure of the casts all showed significant improvements compared with the casts before filtration: the tensile strength was increased 4.0-7.5%; the elongation rate was increased 9.5-15.0%; the metallographic structure was improved a lot, both being ferrite and pearlite before and after filtration, while the ferrite becomes finer after filtration, which is beneficial for performance improvement. Scanning electron microscope analysis of the fracture of the casts before and after filtration indicates that there is sulfide inclusion at the fracture of the unfiltered cast while no inclusion exists at the fracture of the cast after filtration by the filter of the invention.

The above description of the embodiments disclosed is provided to render those skilled in the art is able to carry out or use the present invention. Many modifications of the embodiments described herein will be obvious to those skilled in the art, and the general principles defined herein may be embodied in other embodiments without departing from the spirit or scope of the invention. Thus, the invention is not limited to the illustrated embodiments disclosed herein, but is limited only by the appended claims and the equivalents.

What is claimed is:

1. A filter for filtering molten metal, characterized in that the filter comprises a refractory material, a binder and an additive, wherein the refractory material is bonded to an open cell porous material through the binder to shape by sintering wherein the weight ratio of the refractory material to the binder is 20~45 wt % of the refractory material to 52~78 wt % of the binder, the total contents of the refractory material, the binder and the additive amount to 100%; the binder includes a carbon-based material and a binding material, wherein the carbon-based material is selected from carbon, asphalt, tar, or synthetic asphalt, the binding material is selected from alumino silica gel or silica sol; the refractory material is one or more selected from the group consisting of mullite, corundum or spinel.

2. A method for manufacturing a filter for filtering molten metal, characterized in that the method comprises:
  formulating a refractory material, a binder and an additive with a liquid carrier into a slurry, wherein the weight ratio of the refractory material to the binder is 20~45 wt % of the refractory material to 52~78 wt % of the binder, the total contents of the refractory material , the binder and the additive amount to 100%; the binder includes a carbon-based material and a binding material, wherein the carbon-based material is selected from carbon, asphalt, tar, or synthetic asphalt, the binding material is selected from alumino silica gel or silica sol; the refractory material is one or more selected from the group consisting of mullite, corundum or spinel;

TABLE the comparison of the performance of the casts before and after filtration by filters containing different binder and refractory material

| Example | Elongation rate | | | Tensile strength | | |
| --- | --- | --- | --- | --- | --- | --- |
| | Before filtration % | After filtration % | Increasing rate % | Before filtration MPa | After filtration MPa | Increasing rate % |
| Example 1 | 8.60 | 9.77 | 13.6 | 569.6 | 598.1 | 5 |
| Example 2 | 7.33 | 8.53 | 10.9 | 540.0 | 566.4 | 4.88 |
| Example 3 | 8.40 | 9.50 | 13.1 | 612.0 | 637.9 | 4.23 |
| Example 4 | 8.60 | 9.50 | 10.5 | 584.7 | 619.7 | 5.99 | coating the slurry thus formulated onto an open cell porous material to form at least one refractory coating;

sintering the open cell porous material formed with the refractory coating under a sintering temperature.

3. The method according to claim 2, characterized in that the liquid carrier is water.

4. The method according to claim 2, characterized in that the open cell porous material is reticulated open cell polyurethane foam.

5. The method according to claim 4, characterized in that the sintering temperature is no more than 1150° C.

6. The method according to claim 5, characterized in that the method further comprises: before the step of "sintering the open cell porous material formed with the refractory coating under sintering temperature", drying the open cell porous material coated with the refractory coating under a temperature between 100 and 200° C.

* * * * *